United States Patent
Hamid et al.

(10) Patent No.: US 9,916,444 B2
(45) Date of Patent: *Mar. 13, 2018

(54) RECOVERING FROM UNEXPECTED FLASH DRIVE REMOVAL

(71) Applicant: Kingston Digital, Inc., Fountain Valley, CA (US)

(72) Inventors: Laurence Hamid, Ottawa (CA); Scott Ashdown, Ottawa (CA)

(73) Assignee: Kingston Digital, Inc., Fountain Valley, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/822,202

(22) Filed: Aug. 10, 2015

(65) Prior Publication Data

US 2016/0041792 A1    Feb. 11, 2016

Related U.S. Application Data

(63) Continuation of application No. 13/692,358, filed on Dec. 3, 2012, now Pat. No. 9,104,891.

(51) Int. Cl.
*G06F 21/55* (2013.01)
*G06F 21/70* (2013.01)
(Continued)

(52) U.S. Cl.
CPC .......... *G06F 21/554* (2013.01); *G06F 3/0619* (2013.01); *G06F 3/0656* (2013.01);
(Continued)

(58) Field of Classification Search
CPC .... G06F 21/0815; G06F 21/554; G06F 21/70; G06F 21/74; G06F 21/79; G06F 3/0619; G06F 3/0656; G06F 3/0679
See application file for complete search history.

(56) References Cited

U.S. PATENT DOCUMENTS 6,061,788 A    5/2000 Reynaud et al.
6,314,532 B1 * 11/2001 Daudelin ............ G06F 11/1417
714/23
(Continued)

FOREIGN PATENT DOCUMENTS

CA     EP 2472410 A1 *  7/2012  ........... G06F 13/409
WO     WO2011025185 A2   3/2011

OTHER PUBLICATIONS

Ask the Performance Team Blog, "Windows 8/Windows Server 2012: Windows to Go", https://blogs.technet.microsoft.com/askperf/2012/10/29/windows-8-windows-server-2012-windows-to-go/, Fig 1: Windows to Go creator lunch screen, published Oct. 29, 2012, 1 page.*

(Continued)

*Primary Examiner* — Hadi Armouche
*Assistant Examiner* — Sher A Khan
(74) *Attorney, Agent, or Firm* — Dorsey & Whitney LLP (57) ABSTRACT

Techniques for recovering from unexpected removal of (or other unexpected power loss) a flash memory device from a computer system. An interpolated device driver notes whenever the flash memory device is unexpectedly removed, or otherwise unexpectedly powers off or enters a locked state. If the flash memory device is reinserted, the interpolated device driver reinitializes the flash memory device, and satisfies any flash memory device security protocol, so the flash memory device and the computer system can be restored to their status just before unexpected removal. The interpolated device driver caches requests to the flash memory device, and when status is restored to just before removal, replays those requests to the flash memory device, so the flash memory device responds to those requests as if it had ever been removed. The computer system does not (Continued)

notice any break in service by the flash memory device due to removal and reinsertion.

19 Claims, 3 Drawing Sheets

(51) Int. Cl.
    *G06F 21/74*     (2013.01)
    *G06F 21/79*     (2013.01)
    *G06F 3/06*     (2006.01)
    *G06F 12/0815*     (2016.01)

(52) U.S. Cl.
    CPC ........ *G06F 3/0679* (2013.01); *G06F 12/0815* (2013.01); *G06F 21/70* (2013.01); *G06F 21/74* (2013.01); *G06F 21/79* (2013.01); *G06F 2212/222* (2013.01); *G06F 2221/2101* (2013.01); *G06F 2221/2105* (2013.01)

(56) References Cited

U.S. PATENT DOCUMENTS

| | | |
|---|---|---|
| 6,381,694 B1 | 4/2002 | Yen |
| 6,430,663 B1 | 8/2002 | Ding |
| 6,542,979 B1 | 4/2003 | Eckardt |
| 6,625,754 B1 | 9/2003 | Aguilar et al. |
| 6,944,867 B2 | 9/2005 | Cheston et al. |
| 7,174,457 B1 | 2/2007 | England et al. |
| 8,060,735 B2 | 11/2011 | Madjlessi |
| 9,104,891 B2 | 8/2015 | Hamid et al. |
| 9,129,114 B2 | 9/2015 | Hamid |
| 2005/0066069 A1* | 3/2005 | Kaji ................ G06F 21/43 710/1 |
| 2005/0188277 A1* | 8/2005 | Tayler .............. G06F 11/076 714/39 |
| 2005/0268339 A1* | 12/2005 | Bobrow ............ G06F 21/10 726/26 |
| 2007/0179752 A1* | 8/2007 | Tonouchi ........... G06F 21/606 702/188 |
| 2008/0052507 A1 | 2/2008 | Chow et al. |
| 2008/0239990 A1* | 10/2008 | Ohara .............. H04L 67/1095 370/254 |
| 2008/0244737 A1* | 10/2008 | Hayasaka .......... G06F 21/6209 726/21 |
| 2009/0070576 A1 | 3/2009 | Hocking et al. |
| 2010/0042753 A1* | 2/2010 | Whaley ............. G06F 13/102 710/13 |
| 2010/0235596 A1 | 9/2010 | Carpenter et al. |
| 2011/0055537 A1 | 3/2011 | Yang |
| 2011/0167049 A1* | 7/2011 | Ron ................ G06F 17/30218 707/690 |
| 2011/0173338 A1* | 7/2011 | Chiu ................ G06F 9/5055 709/229 |
| 2012/0042156 A1 | 2/2012 | Ma et al. |
| 2012/0151219 A1* | 6/2012 | Ryu ................ H04L 9/0863 713/185 |
| 2012/0262585 A1* | 10/2012 | Nakano ............ H04N 5/765 348/207.1 |
| 2012/0284494 A1 | 11/2012 | Funk et al. |
| 2014/0156981 A1* | 6/2014 | Hamid ............. G06F 21/575 713/2 |
| 2014/0156982 A1 | 6/2014 | Hamid et al. |

OTHER PUBLICATIONS

Yee, Bennet. "Using Secure Coprocessors." School of Computer Science, Carnegie Mellon University, Pittsburgh, PA. May 1994, Thesis. 20 pages.
"Windows to Go: Scenario Overview", Microsoft Corporation, <https://web.archive.org/web/20120303165246/http://technet.microsoft.com/en-us/library/hh831833.aspx> Accessed Oct. 15, 2015, published Feb. 29, 2012).
Anonymous: "Desinfec't-Wikipedia", Jul. 22, 2012 (Jul. 22, 2012), XP055276372, Retrieved from the Internet: URL:https://de.wikipedia.org/w/index.php?title=Desinfec't&oldid=105866247 [retrieved on May 30, 2016].
European Search Opinion dated Jun. 7, 2016 in corresponding European Application No. 13860762.7.
Machine translation, Anonymous: "Desinfec't-Wikipedia", Jul. 22, 2012 (Jul. 22, 2012), XP055276372, Retrieved from the Internet: URL: https://de.wikipedia.org/w/index.php?title=Desinfec't&oldid=105866247 [retrieved on Jun. 14, 2016].
The extended European Search Report dated Jun. 15, 2016 in connection with European Patent Application No. 13861029.0.

* cited by examiner

RECOVERING FROM UNEXPECTED FLASH DRIVE REMOVAL

CROSS-REFERENCE TO RELATED APPLICATIONS

This application claims priority to U.S. patent application Ser. No. 13/692,358, filed Dec. 3, 2012, entitled "Recovering from Unexpected Flash Drive Removal," issued Aug. 11, 2015, as U.S. Pat. No. 9,104,891 which is incorporated by reference herein, in the entirety and for all purposes. Inventions described in this application can also be used in combination or conjunction, or otherwise, with techniques described in one or more of the following documents.

U.S. patent application Ser. No. 13/692,553, filed Dec. 3, 2012, in the name of the same inventor, titled "Bootability with Multiple Logical Unit Numbers," issued Aug. 30, 2016 as U.S. Pat. No. 9,430,250; and U.S. patent application Ser. No. 13/692,421, filed Dec. 3, 2012, in the name of the same inventor, titled "Preboot environment with system security check," issued Sep. 8, 2015 as U.S. Pat. No. 9,129,114.

Each and every one of these documents is hereby incorporated by reference as if fully set forth herein. These documents are sometimes referred to herein as the "Incorporated Disclosures".

BACKGROUND

Field of the Disclosure

This application generally relates to recovering from unexpected removal of a flash drive from a computer system, and related matters.

Background of the Disclosure

"Flash memory" is a commonly used term for non-volatile data storage that can be read and written multiple times. Flash memory is often used in USB flash drives, sometimes called "flash drives", which are devices including memory which can communicate with a computer system using a universal serial bus (USB) protocol. Flash drives can often maintain relatively large amounts of data, often sufficiently large that operating system software and a suite of application program software can be maintained in the flash memory. Moreover, most flash drives are sufficiently small that they can draw their power requirements from the computer system to which they are connected.

One consequence of being able to store such relatively large amounts of data is that flash drives might be used to maintain an entire operating environment, including both operating system software and application software, as well as documents or other data in use or saved by a user. An operating environment which can be carried about, often on a key ring or in a pocket, is sometimes called a "portable operating environment". For example, one such environment is the "Windows to Go"™ environment promoted by Microsoft Corporation of Redmond, Wash. A first advantage of a portable operating environment is that a user can maintain an entire set of settings for personalized use on any available computer system. A second advantage of a portable operating environment is that a user can conduct their computer processing on any available computer system, without leaving personal or otherwise sensitive data for later review by unauthorized persons.

While portable operating environments have several advantages, they are subject to the disadvantage that they might be lost or stolen, as the flash drive which maintains the program and data storage is itself physically small enough to be relatively easily concealed or forgotten. Because of this, some flash drives include a security element, which prevents access to programs and data stored on the flash drive without proof of authorization. The security element might take control when the flash drive is first powered-on, such as when it is coupled to a computer system, and require proof of authorization before allowing that computer system to conduct read or write operations.

While this might achieve the general purpose of protecting the user's programs and data from unauthorized access, it has the drawback that if the flash drive is unexpectedly (such as accidentally or by mistake) removed from the computer system, the flash drive will lose power, reset its state, and the user will lose whatever work was being conducted when the unexpected removal occurred. For example, loss of access to the flash drive can cause the computer system to incur a crash of its operating system, with a possible loss of important user data. A similar problem can occur if the computer system, such as a laptop operating on battery power, enters a power-saving mode and stops supplying power to the flash drive.

One possibility would be to incorporate a battery or a relatively large capacitor into the flash drive, which would preserve the flash drive's state until it could be reinserted into the computer system or until the user could trigger an exit to the power-saving mode. While this possibility might achieve the general purpose of preserving the flash drive's state upon loss of power, it would be subject to additional cost and size for the flash drive, and the reduced security of the possibility that an active portable environment could be moved from one (authorized) computer system to another (unauthorized) computer system.

One possibility would be for the computer system to pause its operations when the flash drive is unexpectedly removed, such as suggested for the "Windows to Go" ™ environment described above. While this possibility might achieve the general purpose of preserving the computer system's state when the flash drive is unexpectedly removed, it would be subject to the drawback that flash drives which require a login operation on startup would be in a different state than expected by the computer system, and vice versa. The flash drive would expect the computer system to attempt authorization, while the computer system would expect the flash drive to continue operation. A conflict of state between the two might incur a crash of the computer system, with a possible loss of important user data.

Each of these examples, as well as other possible considerations, can cause difficulty in a portable operating environment, particularly when reliability and security of that portable operating environment are important to the user. For example, the user should take care that the flash memory device does not lose power, such as by specially protecting the flash memory device against accidental removal, providing an additional power source, or disabling the computer system's power-saving modes. Moreover, the user should take care to save their partial results frequently, possibly drawing on the read/write abilities of the flash memory device, possibly interrupting the user's work, and possibly placing additional load on the computer system. Each of these might have a detrimental effect on the value of the computer system and on use of a portable operating environment therewith.

BRIEF SUMMARY OF THE DISCLOSURE

This application provides techniques for recovering from unexpected removal (or other unexpected power loss) of a secure flash memory device from a computer system. In one embodiment, an interpolated device driver notes when the flash memory device is unexpectedly removed from the computer system, or otherwise unexpectedly powers off or unexpectedly enters a locked state. If the flash memory device is reinserted relatively rapidly, such as within a time frame tolerated by the operating system (which could include a suspended state for the operating system, such as in the Windows to Go™ environment), the interpolated device driver conducts any reinitialization of the flash memory device, including any security protocol used by the flash memory device with the computer system, with the effect that the flash memory device and the computer system are restored to the status they had just before the unexpected event.

In one embodiment, the interpolated device driver also caches requests from the computer system to the flash memory device, and when the flash memory device and the computer system are restored to their pre-removal status, replays those requests to the flash memory device, with the effect that the flash memory device responds as if it had never been removed from the computer system. This has the effect that the computer system does not notice any break in service by the flash memory device due to the flash memory device's removal and reinsertion.

In one embodiment, the interpolated device driver retains only a portion of the security information it needs to conducts reinitialization of the flash memory device, such as only half of a password or passphrase for use with a security protocol conducted by the flash memory device with the computer system, and only retrieving the other half of that password or passphrase after the user has obtained authorization to use the flash memory device. This has the effect that examination of the computer system after removing the flash drive does not allow unauthorized persons to readily retrieve that security information. In this context, "half" of a password or passphrase is not required to be a first half or a last half or even any other distinct portion thereof. It is sufficient that it is possible that each so-called "half" is needed, at a cryptographically-strong degree of difficulty, to obtain the entire password or passphrase. For example, each half of the password or passphrase might be needed to be combined cryptographically to recreate the password or passphrase.

In one embodiment, the flash memory device can maintain its portion of the security information as being readable without requiring authentication, such as being publicly accessible. The interpolated device driver can maintain its portion of the security information in memory, with attackers unable to obtain the in-memory portion without permission from the interpolated device driver. This has the effect that attackers are only able to obtain the publicly accessible portion of the security information, which would not be sufficient to reconstruct, or otherwise obtain, the entire password or passphrase. This also has the effect that, if the flash memory device is removed and is not reinserted within the required time, the computer system would shut down, and the portion of the security information maintained in memory by the interpolated device driver would no longer be available for attackers to find.

After reading this application, those skilled in the art would recognize that techniques shown in this application are applicable to fields and information other than those fields specifically described herein, and to other than flash memories. In the context of the invention, there is no particular requirement for any such limitation. For example, the invention is also applicable to other forms of data storage in which the data storage device maintains some form of security against unauthorized reading, writing, or other use.

Moreover, after reading this application, those skilled in the art would recognize that techniques shown in this application are applicable to methods and systems other than those involving portable operating environments. In the context of the invention, there is no particular requirement for any such limitation. For example, other contexts can include frequent or important access to secured data, such as data that is otherwise hardware-protected, software-protected, or protected by use of a proprietary data format.

After reading this application, which shows and describes illustrative embodiments of the disclosure, other and further embodiments of the present disclosure will become apparent to those skilled in the art. As will be realized, the various embodiments of the present disclosure are capable of modifications in various obvious aspects, all without departing from the scope and spirit of the present disclosure. The drawings and detailed description are intended to be illustrative in nature and not restrictive in any way.

DETAILED DESCRIPTION

Example System Elements

Figure 1:
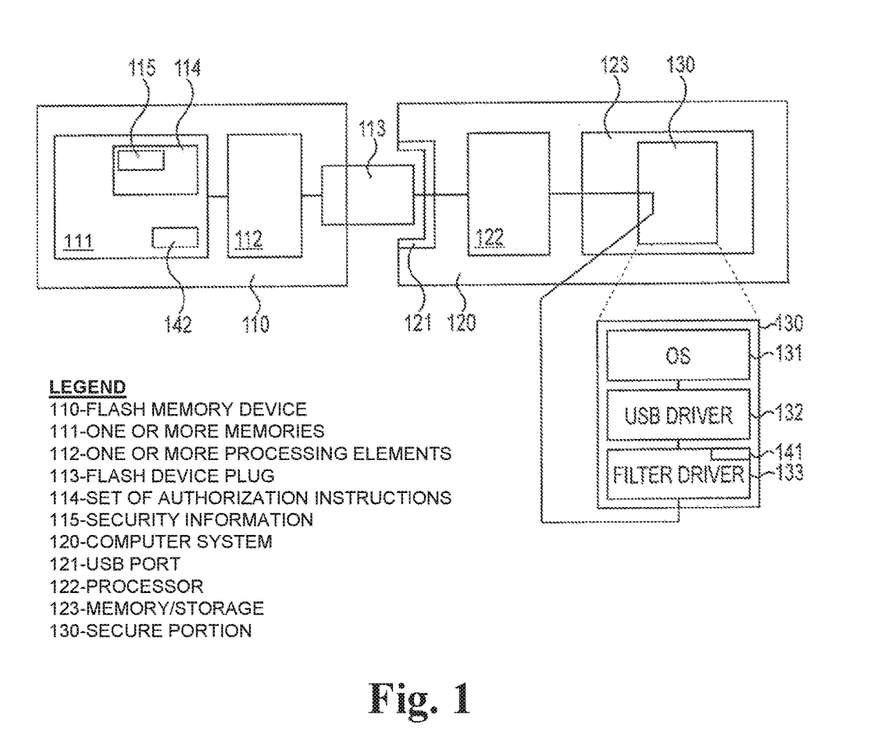
FIG. 1 shows a conceptual drawing of an apparatus including a flash memory device.

FIG. 1 shows a conceptual drawing of an apparatus including a flash memory device.

In one embodiment, a system 100 can include a flash memory device 110 and a computer system 120.

Flash Memory Device.

The flash memory device 110 can include one or more memories 111, one or more processing elements 112, and at least one flash device plug 113. For example, the flash memory device 110 can be disposed to be compatible with a universal serial bus (USB) standard, or a variant thereof, and can be packaged in a relatively small package disposed to be coupled to a USB port 121 (described with reference to the computer system 120), or a variant thereof.

While this application primarily describes a system in which the flash memory device 110 is coupled to the computer system 120 using a USB standard or a variant thereof, in the context of the invention, there is no particular requirement for any such limitation. For a first example, the flash memory device 110 can be coupled to the computer system 120 using another way to couple devices to computer systems, such as a Thunderbolt™ drive available from Apple, Inc. of Cupertino, Calif. For a second example, the flash memory device 110 can be coupled to the computer system 120 using a network connection, a wireless connection, or another type of connection available for communication between computing devices.

In one embodiment, the one or more memories 111 can include a set of authorization instructions 114, such as authorization software which interacts with the computer system 120, responds to a login therefrom, and determines whether the computer system 120 (or a user thereof) is authorized to use the flash memory device 110. For example, the computer system 120 could present a login screen to a user, and require a password for authorization, and the authorization instructions 114 could respond to whether the provided password was a correct password.

In one embodiment, the flash memory device 110 could compare information received from the computer system 120 with one or more sets of security information 115 maintained on the flash memory device 110 and available to the authorization instructions 114. The security information 115 can include a pass phrase, password, public key cryptographic element, shared secret, or other technique for authentication of authorized computers or users. In one embodiment, the security information 115 can be maintained by the flash memory device 110 in an encrypted format (either included in the authorization instructions 114 or otherwise), or in a section of the flash memory device 110 not allowed for reading by ordinary users, in special hardware, or otherwise protected against ready availability to computer systems 120 coupled to the flash memory device 110.

In one embodiment, the one or more memories 111 can include a read-only zone, for which the flash memory device 110 allows only read operations and prohibits write operations that might be requested by the computing system 120. This has the effect that computer systems 120, or other users of the flash memory device 110, cannot readily alter the content of the read-only zone. For example, the authorization instructions 114 could be maintained in the read-only zone and the flash memory device 110 could require that the authorization instructions 114 are the first instructions executed when the flash memory device 110 is powered-on. This would have the effect that each time the flash memory device 110 is powered-on, the authorization instructions 114 would be assured to be executed before any other activity.

In one embodiment, the one or more memories 111 can include a secure read/write zone, for which the flash memory device 110 allows both read operations and write operations that might be requested by the computing system 120, but for which the flash memory device 110 does not allow data to be viewed at the request of user programs on the computing system 120. For example, the secure read/write zone could be maintained hidden from a directory structure of files maintained by the flash memory device 110, without special access by the computer system 120 (such as "administrator" privileges). This has the effect that the secure read/write zone can maintain information for use by authorization elements in the computer system 120, without that information being readily available to application programs or to users of the computer system 120.

Computer System.

The computer system 120 can include a USB port 121, a processor 122, and memory or storage 123. For example, the USB port 121 can be coupled to the processor 122, which can be coupled to the memory or storage 123.

In one embodiment, the memory or storage 123 can include a secure portion 130, which can maintain operating system software 131, USB driver software 132, and an interpolated device driver 133. A secure portion 130 of the memory or storage 123 can be protected by the computer system 120, such as by the operating system software 131, against being readily available to application programs or to users of the computer system 120.

In one embodiment, when the processor 122 attempts to conduct a read or write operation with the flash memory device 110, the processor 122 directs a request to the operating system software 131. The operating system software 131 calls upon the USB driver software 132 to cause the USB port 121 to exchange information with the flash device plug 113. The USB driver software 132 calls upon the interpolated device driver 133, which normally passes instructions through to the USB port 121, but is prepared to intercede when the flash memory device 110 undergoes an unexpected removal or a consequent reinsertion, as described herein. This has the effect that read and write requests from the computer system 120, whether from the user, from an application program, or from the operating system software 131, are available to the interpolated device driver 133, which can intercept and hold those read or write requests if necessary or desirable.

In one embodiment, the interpolated device driver 133 can include (or otherwise have access to) a first security token 141 S1, which it can use (in conjunction with a second security token 142 S2, as described herein) to reconstruct the security information 115 to obtain access to the flash memory device 110. For example, the first security token 141 S1 can be maintained in a portion of the memory or storage 123 reserved for use by the interpolated device driver 133, with the effect that users of the computer system 120 cannot readily obtain the first security token 141 S1 without permission from the interpolated device driver 133.

In one embodiment, the interpolated device driver 133 can obtain the second security token 142 S2 from the flash memory device 110, such as from the secure read/write zone, or from another read/write portion of the flash memory device 110 which is maintained hidden from users of the computer system 120 by the operating system software 131 or by the USB driver software 132. While this application primarily describes the second security token 142 S2 as being maintained hidden from users of the computer system 120, in the context of the invention, there is no particular requirement for any such limitation. For example, the second security token 142 S2 can be maintained in a publicly readable portion of the flash memory device 110, so long as the second security token 142 S2 is not by itself sufficient to obtain authorization for flash memory device 110 (such as, so long as access to the first security token 141 S1 is not also readily available to unauthorized users).

In one embodiment, when the flash memory device 110 is coupled to the computer system 120, the computer system 120 provides the security information 115 to the flash memory device 110, to show the flash memory device 110 that the computer system 120 is authorized to access the flash memory device 110. For example, the computer system 120 can request the security information 115 from a user using a login screen, as described above. The interpolated device driver 133 intercepts the security information 115, and determines when it is correct, such as in response to whether the flash memory device 110 accepts that security information 115 to allow access.

In one embodiment, when the security information 115 is correct, the interpolated device driver 133 determines the first security token 141 S1 and the second security token 142 S2 in response thereto. The first security token 141 S1 and the second security token 142 S2 are each selected so that the security information 115 can be relatively easily determined in response to a function $f(S1, S2)$, but that the security information 115 cannot readily be determined in response to only one of the two $\{S1, S2\}$. For example, the first security token 141 S1 could be a decryption key, which when applied to the second security token 142 S2, yields the security information 115 $f(S1, S2)$.

In one embodiment, the interpolated device driver 133 determines the first security token 141 S1 and the second security token 142 S2 in a manner that the security information 115 is cryptographically difficult to determine. For example, the interpolated device driver 133 can receive a password or passphrase from the user of the computer system 120. The interpolated device driver 133 can generate a "random" key, such as an AES encryption/decryption key, using a pseudorandom technique that is cryptographically hard, and select the first security token 141 S1 to equal that "random" key. The interpolated device driver 133 can generate the second security token 142 S2 as Enc (password, S1) and recover the security information 115 as Dec (S2, S1), where Enc is an encryption function and Dec is the corresponding decryption function.

Example State Diagram

Figure 2:
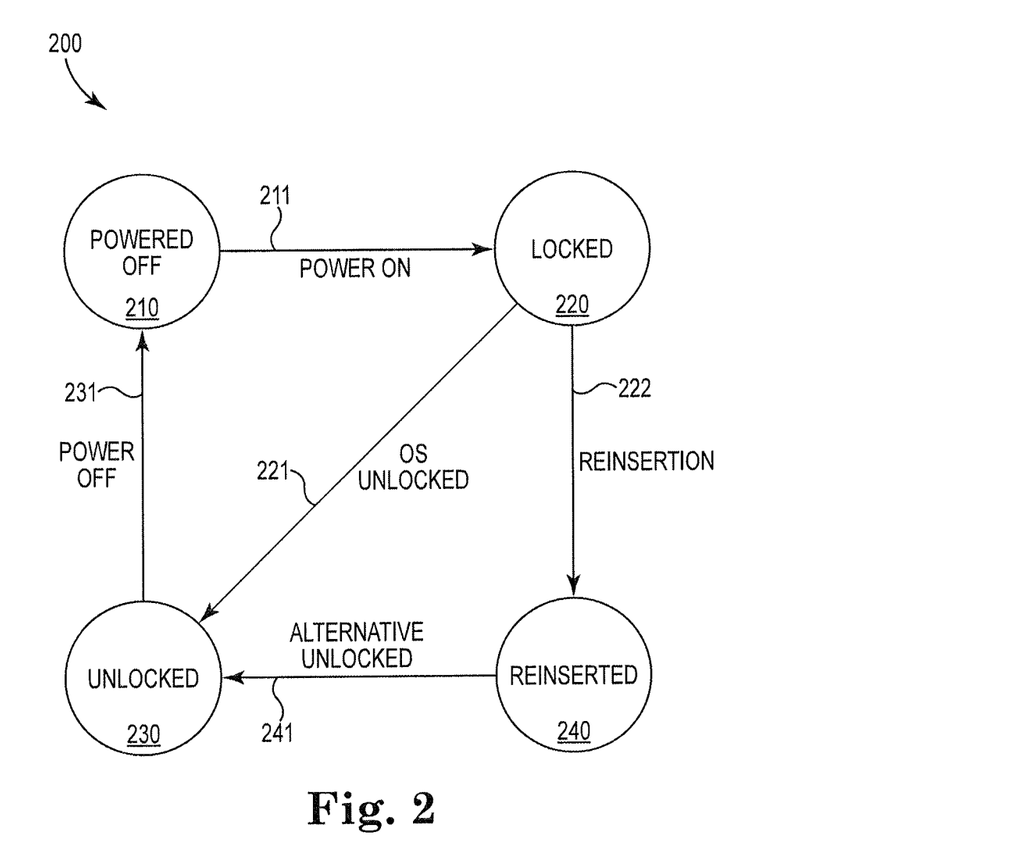
FIG. 2 shows a conceptual drawing of a state diagram.

FIG. 2 shows a conceptual drawing of a state diagram.

A state diagram 200 includes a set of states and a set of state transitions. While this application primarily describes these states and state transitions in the context of a single flash memory device 110, in the context of the invention, there is no particular requirement for any such limitation. For example, a system (such as one similar to that described with respect to the FIG. 1) can include more than one such flash memory device 110, and can include a separate state for each such flash memory device 110.

Moreover, while this application primarily describes these states and state transitions in the context of operating a flash memory device 110 according to techniques described herein, there is no particular requirement that these are the only states and state transitions which might apply, whether to the flash memory device 110, to the computer system 120, or to both. For a first example, the flash memory device 110 can have a state transition from the locked state 220 (as described below) to the powered off state 210 (as described below), which can be invoked if the flash memory device 110 is in the locked state 220 and determines to power itself off. For a second example, the flash memory device 110 can have a state transition from the unlocked state 240 (as described below) to the locked state 220 (as described below), which can be invoked if the flash memory device 110 is in the unlocked state 240 and determines to lock itself without conducting a further security transaction. After reading this application, those skilled in the art would recognize other and further states and state transitions which might be applicable, which would be workable, and are within the scope and spirit of the invention.

In one embodiment, a powered-off state 210 describes when the flash memory device 110 is powered-off, or otherwise not responding to electronic signals. For example, the powered-off state 210 can represent when the flash memory device 110 has been removed from the computer system 120 and no longer is receiving any power supply from the computer system 120.

The powered-off state 210 can have a power-on state transition 211, when the flash memory device 110 is powered-On. For example, the power-on state transition 211 can be triggered when the flash memory device 110 is coupled to the computer system 120, such as when the USB plug 113 is inserted into the USB port 121. In such cases, the computer system 120 can supply power to the flash memory device 110, with the effect that the flash memory device 110 is powered-On, with the effect that the flash memory device 110 enters the power-on state transition 211 and conducts its associated activities.

When the flash memory device 110 conducts the power-on state transition 211, the hardware elements of the flash memory device 110 force it to enter a locked state 220.

In one embodiment, the locked state 220 describes when the flash memory device 110 is secured against reading or writing to its memory 111 (whether that security is enforced by hardware, software, or otherwise). For example, in the locked state 220, the processor 112 can refuse to conduct any read or write operations requested by the computer system 120. In the locked state 220, the flash memory device 110 is prevented from conducting any read or write operations with any other device (such as the computer system 120) until it has assured itself that a user of that other device is authorized to conduct those read or write operations.

In one embodiment, when the flash memory device 110 is in the locked state 220, the interpolated device driver 133 intercepts requests to read or write to its memory 111, as described herein. The interpolated device driver 133 maintains those requests in a cache, so as to later pass those requests through to the flash memory device 110 when the latter enters the unlocked state 230, as described below. In one embodiment, the interpolated device driver 133 also intercepts and caches requests to the flash memory device 110 when the latter is in the powered-off state 210, as described herein. For example, as described herein, the interpolated device driver 133 can intercept and cache requests to the flash memory device 110 for a selected time duration, or until another triggering event. This has the effect that, when the flash memory device 110 is in the locked state 220, the interpolated device driver 133 can present the computer system 120 with the impression that the flash memory device 110 is nonetheless available for use.

The locked state 220 can have an OS-unlock protocol state transition 221, in which the computer system 120 performs a security protocol to unlock the flash memory device 110. For example, the OS-unlock protocol state transition 221 can include an exchange of information between the flash memory device 110 and the computer system 120, in which the processor 112 in the flash memory device 110 determines that the computer system 120 is authorized to read from, or write to, or both read from and write to, the memory 111. In one such case, the OS-unlock protocol can compare information provided by the computer system 120 with security information 115 maintained on the flash memory device 110. When the flash memory device 110 conducts the OS-unlock protocol state transition 221, it enters the unlocked state 230.

As further described herein, the locked state 220 can have a reinsertion state transition 222, in which the flash memory device 110 has recently entered the locked state 220 because it was reinserted into the USB port 121 (or otherwise reconnected to the computer system 120, or otherwise restored to power-on). For example, the reinsertion state transition 222 can occur a relatively short time after physical reinsertion of the flash memory device 110 into the USB port 121 (that is, just after the flash memory device 110 powers up from the physical reinsertion and enters the locked state 220), or a recognition by the interpolated device driver 133 that the flash memory device 110 has been unexpectedly powered-off and action by the interpolated device driver 133 to restore power to the flash memory device 110 (that is, just after the flash memory device 110 powers up from the restoration of power and enters the locked state 220). When the flash memory device 110 conducts the reinsertion state transition 222, it enters the reinserted state 240.

In one embodiment, the unlocked state 230 describes when the flash memory device 110 is ready and able to proceed with read operations, write operations, or both read and write operation, as appropriate, as requested by the computer system 120.

The unlocked state 230 can have a power-off state transition 231, when the flash memory device 110 is powered-off. As described herein, the power-off state transition 231 can be triggered when the flash memory device 110 is ejected by the computer system 120, such as when the user of the computer system 120 intentionally exits the portable operating environment. Alternatively, as described herein, the power-off state transition 231 can be triggered when the flash memory device 110 is unexpectedly removed from the computer system 120. When the flash memory device 110 conducts the power-off state transition 231, it enters the powered-off state 210.

In one embodiment, a reinserted state 240 describes when the flash memory device 110 has recently been reinserted into the USB port 121 (or otherwise reconnected to the computer system 120, or otherwise restored to power-on), as described herein.

The reinserted state 240 can have an alternative-unlock protocol state transition 241, in which the interpolated device driver 133 performs a security protocol, similar to the OS-unlock protocol state transition 221, to unlock the flash memory device 110. In one embodiment, the interpolated device driver 133 collects the first security token 141 S1 and the second security token 142 S2, and determines the security information 115 in response to a function ƒ (S1, S2), as described herein. The interpolated device driver 133 uses the security information 115 to perform the security protocol in conjunction with the flash memory device 110. When the flash memory device 110 conducts the alternative-unlock protocol state transition 241, it enters the unlocked state 230.

Method of Operation

Figure 3:
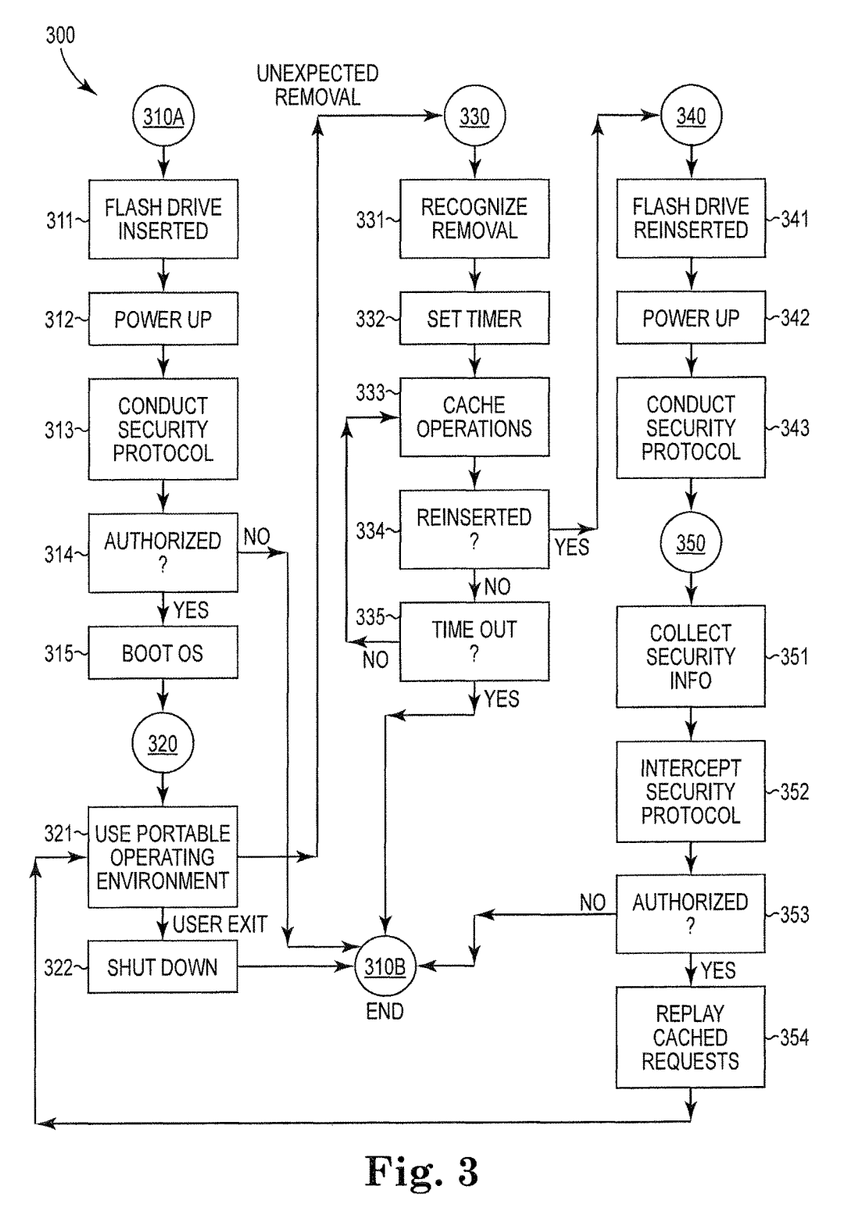
FIG. 3 shows a conceptual drawing of a method of operation.

FIG. 3 shows a conceptual drawing of a method of operation.

A method 300 includes a set of flow labels and method steps, as further described herein. Although this application describes one or more flow labels and method steps in sequence, in the context of the invention, there is no particular requirement for any such limitation. For example, the method 300 could be performed in parallel, in a pipelined manner, by more than one computing device or other electronic hardware, by more than one process or thread in the one or more computing devices or other electronic hardware, by one or more special purpose electronic devices, or otherwise.

Flash Drive Startup.

A flow label 310A indicates a beginning of the method 300. In one embodiment, the flash memory device 110 is ready to be coupled to the computer system 120.

At a step 311, the flash memory device 110 has its USB plug 113 inserted into a corresponding USB port 121 of the computer system 120.

At a step 312, the flash memory device 110 begins to receive power from the computer system 120. As part of this step, the flash memory device 110 powers up and starts operation.

At a step 313, the flash memory device 110 conducts a security protocol with the computer system 120.

At a step 314, the flash memory device 110 determines whether the computer system 120 is authorized to operate in conjunction with the flash memory device 110. If so, the method 300 proceeds with the next step. If not, the flash memory device 110 remains locked and the method 300 proceeds at the flow label 310B (where the method 300 terminates).

At a step 315, the computer system 120 boots its operating system software 131 from the flash memory device 110. As part of this step, the computer system 120 begins operation using the operating system software 131 found on the flash memory device 110.

Portable Operating Environment.

A flow label 320 indicates that the computer system 120 is ready to receive instructions from the flash memory device 110, with the effect of performing operations within the portable operating environment.

At a step 321, the computer system 120 performs operations within the portable operating environment. As part of this step, the computer system 120 reads instructions from the flash memory device 110, writes intermediate data to the read/write zone included in the flash memory device 110, and interacts with the user, as directed by the instructions from the flash memory device 110. This step is repeated until either (A) the user causes an exit from the portable operating environment, in which case the method 300 proceeds with the step 322, or (B) the flash memory device 110 is removed from the computer system 120, in which case the method 300 proceeds at the flow label 330.

At a step 322, the computer system 120 shuts down the portable operating environment, instructs the flash memory device 110 to power off, and ejects the flash memory device 110. As part of this step, the flash memory device 110 prepares for ejection (if time permits), and powers off when the computer system 120 removes power. As described herein, when the computer system 120 "ejects" the flash memory device 110, it generally means that the computer system 120 terminates the availability of the flash memory device 110 to the user. While this application primarily describes an embodiment in which ejection of the flash memory device 110 means that it is physically removed from the computer system 120, in the context of the invention, there is no particular requirement for any such limitation. For example, the flash memory device 110 can remain physically coupled to the computer system 120, but without the computer system 120 allowing access to the flash memory device 110.

As part of this step, the computer system 120 may optionally proceed to operation of a non-portable execution environment, may proceed to operation of a different portable execution environment using a different flash memory device 110, may shut down, or otherwise. In any such case, the method 300 is considered to be complete, and proceeds at the flow label 310B (where the method 300 terminates).

Unexpected Removal.

A flow label 330 indicates that the flash memory device 110 has been unexpectedly removed from the computer system 120.

At a step 331, the interpolated device driver 133 recognizes that the flash memory device 110 has been removed from the computer system 120.

At a step 332, the interpolated device driver 133 sets a removal timer (not shown). As part of the step, the removal timer begins to count toward a trigger value, such as zero. While this application primarily describes a removal timer as a trigger condition for the computer system 120 to recognize that the flash memory device 110 is not expected to be returned anytime soon, in the context of the invention, there is no particular requirement for any such limitation. For example, the computer system 120 may instead recognize a different termination condition (either instead or or in addition to the removal timer) as indicating that the flash memory device 110 will remain removed for the purposes of the method 300.

At a step 333, while the removal timer has not completed (or alternatively, if another recognized termination condition has not yet occurred), the interpolated device driver 133 presents to other elements of the computer system 120 that the flash memory device 110 is still operational, and receives and caches any read or write instructions from the computer system 120 to the flash memory device 110. In alternative embodiments, the interpolated device driver 133 may respond to read or write instructions with a response indicating the flash memory device 110 is not ready.

At a step 334, the computer system 120 determines if the flash memory device 110 has been reinserted into the computer system 120. If not, the computer system 120 proceeds with the next step. If so, the computer system 120 proceeds at the flow label 340.

At a step 335, the computer system 120 determines if the removal timer has completed (or alternatively, if another recognized termination condition has occurred). If not, the computer system 120 proceeds with the step 333. If so, the computer system 120 determines that the flash memory device 110 will stay removed for a substantial time duration, and proceeds at the flow label 310B (where the method 300 terminates).

Flash Drive Reinserted.

A flow label 340 indicates that the flash memory device 110 has been reinserted into the computer system 120 within a timeout duration (or alternatively, before a recognized termination condition has occurred).

At a step 341, similar to the step 311, the flash memory device 110 has its USB plug 113 inserted into a corresponding USB port 121 of the computer system 120.

At a step 342, similar to the step 312, the flash memory device 110 begins to receive power from the computer system 120. As part of this step, the flash memory device 110 powers up and starts operation.

At a step 343, similar to the step 313, the flash memory device 110 attempts to conduct a security protocol with the computer system 120. In one embodiment, this step can include the interpolated device driver 133 detecting the re-availability of the flash memory device 110, and initiating the security protocol with the flash memory device 110.

Security Protocol Intercepted.

A flow label 350 indicates that the interpolated device driver 133 is ready to intercept the security protocol which the flash memory device 110 attempts to conduct with the computer system 120.

At a step 351, the interpolated device driver 133 collects the first security token 141 S1 and the second security token 142 S2, and determines the security information 115 in response to a function $f$ (S1, S2), as described herein. This has the effect that the interpolated device driver 133 determines sufficient information to conduct its portion of the security protocol which the flash memory device 110 attempts to conduct with the computer system 120.

At a step 352, the interpolated device driver 133 receives any messages and makes any responses to the flash memory device 110 which are part of the security protocol. This has the effect that the interpolated device driver 133 causes the flash memory device 110 to reenter the state that it was in before it was unexpectedly removed from the computer system 120.

At a step 353, similar to the step 314, the flash memory device 110 determines whether the computer system 120 is authorized to operate in conjunction with the flash memory device 110. (Presumably, the flash memory device 110 will arrive at the same determination as in the step 313.) If so, the method 300 proceeds with the next step. If not, the flash memory device 110 remains locked and the method 300 proceeds at the flow label 310B (where the method 300 terminates).

At a step 354, the interpolated device driver 133 transfers any requests to the flash memory device 110 from the computer system 120, which it had cached, with the effect that the flash memory device 110 performs those operations that were requested by the computer system 120 while it was disconnected.

The method 300 proceeds with the step 321, with the effect that the computer system 120 continues to perform within the portable operating environment without recognizing that the flash memory device 110 had been unexpectedly removed and then reinserted.

Alternative Embodiments

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A removable memory device configured for coupling to a computer, the removable memory device comprising:
    memory configured for storing security information; and
    a processor configured for comparing the security information to information provided by the computer, wherein the computer is authorized to access the memory device to execute an operating environment calling a driver configured for:
        recognizing that the memory device has been disconnected from the computer;
        in response to recognizing that the memory device has been disconnected from the computer:
            defining a termination condition as a trigger value of a removal timer; and while the termination condition has not occurred:
  intercepting read and write requests from the computer to the memory device,
  caching the requests, and
  presenting to other elements of the computer that the memory device is operational;
determining that the memory device has been reconnected to the computer before the termination condition has occurred;
intercepting a security protocol which the memory device attempts to conduct with the computer;
performing the security protocol in conjunction with the memory device, using the security information; and
transferring the cached requests to the memory device, wherein the computer continues to perform within the operating environment and the memory device performs operations requested by the computer while the memory device was disconnected.

2. The device of claim 1, wherein the driver is configured to reconstruct the security information to obtain access to the memory device.

3. The device of claim 1, wherein the driver is configured to reconstruct the security information in response to a function of a first security token reserved for the driver and a second security token obtained from the memory device.

4. The device of claim 3, wherein the first security token comprises a decryption key applied to the second security token to yield the security information.

5. The device of claim 2, wherein the second security token is maintained on the memory device and is not by itself sufficient to obtain authorization for the memory device so long as access to the first security token is not available.

6. The device of claim 1, wherein the operating environment comprises a portable operating environment maintained on the memory device.

7. The device of claim 6, wherein the portable operating environment maintains settings for personalized use on the computer, without leaving personal data for later review.

8. The device of claim 1, wherein the memory device is coupled to the computer using a network or wireless connection.

9. A method comprising:
coupling a removable memory device to a computer, the removable memory device comprising memory configured for storing security information;
comparing the security information with information provided by the computer, wherein the computer is authorized to access the memory device and boot a portable operating environment therefrom, the portable operating environment calling a driver configured for:
recognizing that the memory device has been disconnected from the computer;
in response to recognizing that the memory device has been disconnected from the computer:
  defining a termination condition as a trigger value of a removal timer; and
  while the termination condition has not occurred:
    intercepting requests to access the memory device from the computer,
    caching the requests,
    presenting to other elements of the computer that the memory device is operational; and
    determining that the memory device has been reconnected;
intercepting a security protocol which the memory device attempts to conduct with the computer;
performing the security protocol in conjunction with the memory device, wherein the driver reconstructs the security information as a function of a first security token reserved for use by the driver and a second security token obtained from the memory device; and
transferring the cached requests to the memory device, wherein the memory device performs operations requested by the computer while the memory device was disconnected; and
wherein the computer continues to perform within the portable operating environment without recognizing the memory device was disconnected.

10. The method of claim 9, further comprising:
the computer requesting the security information from a user;
the driver determining the security information is correct in response to whether the memory device accepts the security information to allow access; and
the driver determining the first and second security tokens in response thereto.

11. The method of claim 10, wherein the second security token is not by itself sufficient to obtain authorization for the memory device so long as access to the first security token is not available.

12. The method of claim 9, wherein the portable operating environment maintains settings for personalized use on the computer, without leaving personal data for later review.

13. The method of claim 9, wherein coupling the memory device to the computer comprises a network or wireless connection.

14. The method of claim 9, wherein recognizing that the memory device has been disconnected comprises the user removing the memory device from the computer.

15. The method of claim 9, wherein recognizing that the memory device has been disconnected comprises the memory device powering off or entering a locked state.

16. The method of claim 15, wherein performing the security protocol comprises unlocking the memory device.

17. A removable memory device configured for coupling to a computer, the removable memory device comprising:
memory configured for storing security information; and
a processor configured for comparing the security information to information provided by the computer, wherein the computer is authorized to access the memory device to boot a portable operating environment therefrom, the portable operating environment calling a driver configured for:
recognizing that the memory device has been disconnected;
in response to recognizing that the memory device has been disconnected from the computer:
  defining a termination condition as a trigger value of a removal timer; and
  while the termination condition has not occurred:
    intercepting requests to access the memory device from the computer,
    caching the requests while presenting to other elements of the computer that the memory device is operational, and
    determining that the memory device has been reconnected;
intercepting a security protocol the memory device attempts to conduct with the computer;

reconstructing the security information as a function of a first security token reserved for the driver and a second security token obtained from the memory device;
performing the security protocol in conjunction with the memory device, using the security information; and
transferring the cached requests to the memory device, wherein the computer continues to perform within the portable operating environment and the memory device performs operations requested by the computer while the memory device was disconnected.

18. The removable memory device of claim 17, wherein the portable operating environment maintains settings for personalized use on the computer, without leaving personal data for later review.

19. The removable memory device of claim 17, wherein the driver is configured to generate the first and second token in response to the security information being entered by a user, the driver determining the security information is correct in response to whether the memory device accepts the security information to allow access.

* * * * *